Nov. 10, 1959   G. M. ROOT   2,912,558
DEVICE FOR DRYING TIRES
Filed July 24, 1957
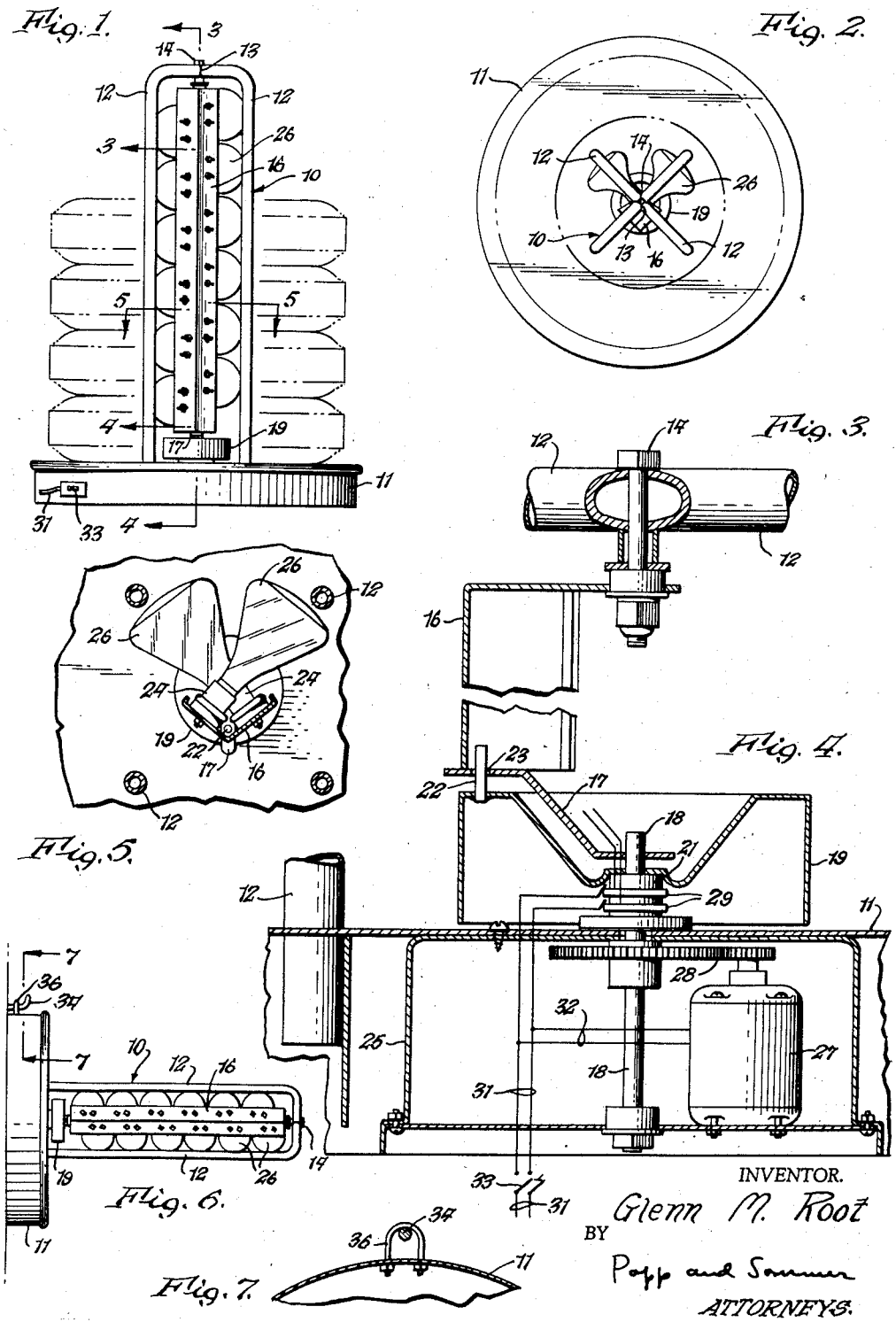
INVENTOR.
Glenn M. Root
BY
Popp and Sommer
ATTORNEYS.

United States Patent Office 2,912,558
Patented Nov. 10, 1959

2,912,558

DEVICE FOR DRYING TIRES

Glenn M. Root, Buffalo, N.Y., assignor to Loomis-Root Inc., Buffalo, N.Y., a corporation of New York Application July 24, 1957, Serial No. 673,926

9 Claims. (Cl. 219—34)

This invention relates to dryers, and more particularly to an infra-red dryer for use in vehicle tire recapping or repairing.

In the repairing or recapping of a vehicle tire it is necessary that the tire casing be dry. The device of the present invention provides a convenient means for drying tires and features an arrangement providing direct radiation of the inside of the tire to thereby provide rapid and thorough drying action. In addition, the tire dryer of the invention is portable so that it may be used for stacking tires vertically during drying, or arranging them horizontally.

The main object of this invention is to provide a vehicle tire dryer which utilizes heat applied directly to the inner surface, or casing of a tire for the heating thereof.

A more specific object of this invention is to provide a vehicle tire dryer which utilizes infra-red radiation applied directly to the inner surface, or casing of a tire for the heating thereof.

Another object of this invention is to provide a vehicle tire dryer which is convenient to use and effective in action.

A further object of this invention is to provide a tire dryer which may be used for the drying of vertically stacked tires or horizontally arranged tires.

These and further objects and features of the invention will become more apparent from the following description and the accompanying drawing wherein:

Fig. 1 is an elevation view of a vehicle tire dryer embodying the principles of the invention;

Fig. 2 is a plan view of the vehicle tire dryer of Fig. 1;

Fig. 3 is an enlarged section view generally as seen from line 3—3 in Fig. 1;

Fig. 4 is an enlarged section view generally as seen from line 4—4 in Fig. 1;

Fig. 5 is a section view generally as seen from line 5—5 in Fig. 1;

Fig. 6 is a view showing the dryer of Fig. 1 as used for drying horizontally arranged tires; and Fig. 7 is a section view as seen from line 7—7 in Fig. 6.

Referring now to the drawing and more particularly to Fig. 1, a vehicle tire dryer illustrating an embodiment of the invention, comprises a circular stand, or base portion 11 to which is affixed in upright position a frame 10 consisting of four pipes, bars, or tubular members 12 bent at their upper portion and joined at 13, such as by welding. The overall diametrical distance of opposite pipes 12 is somewhat less than the minimum inside diameter of the vehicle tires to be dried. The tires, indicated by broken lines, are threaded over this frame or tire retaining structure and for this purpose this frame or tire retaining structure 10 is in cantilever relation to the base portion 11 so that the tires can be placed over the outboard end thereof and arranged in concentric relation, with the frame or tire retaining structure arranged in the centers of the tires. A hanger, or bolt 14 projects downwardly from the joined portion 13 and supports at the upper end a lamp housing 16 the lower end of which has affixed thereto an arm 17, which is slidably arranged upon a shaft 18. A recessed circular drum, or housing 19, having an open bottom, is supported upon a sleeve 21 which is secured to the shaft 18 for rotation therewith. A pin 22 is affixed to the top of the housing 19 and extends upwardly through a hole 23 formed in the arm 17, as best seen in Fig. 4.

The lamp housing 16 is substantially V-shaped in end projection and is arranged in the space or chamber bounded by the bars 12 of the frame 10 to support a plurality of lamp sockets 24, the latter of which are adapted to receive in alternate crisscross manner a battery of infra-red radiation lamps 26 having their axis parallel with the top of the base portion 11. An electric motor 27 is supported within a housing 25 mounted in the base portion 11, and is connected to the shaft 18 by means of a reduction gear assembly 28. It will be seen that operation of the motor 27 will cause rotation of the shaft 18, which rotation will be transmitted to the drum 19 and the lamp housing 16 via the pin 22.

A slip ring arrangement 29, shown schematically, is provided for conducting electrical current from a power line 31 to the lamp sockets 24, the latter of which are wired in a parallel circuit manner. Wires 32 extend from the power line 31 to the electric motor 27, while a switch 33 is provided in the line 31 for control of current to the motor and the lamps 26. It will be seen that rotation of the lamp housing will result in rotary movement of the lamps 26 within the confines of the frame 10.

The tires to be dried may be vertically stacked about the frame 10, as illustrated in Fig. 1, said tires having their beaded end open by the use of sticks (not shown) or equivalent, thus exposing a greater area of the tire casing to the direct radiation of the infra-red radiation lamps 26. Upon closing the switch 33, the motor 27 will be activated to cause rotation of the lamp housing 16, and simultaneously light the infra-red radiation lamps 26. The latter will thus be caused to rotate so that heating by infra-red radiation is applied directly to the inside of each tire to dry the casing in an effective and efficient manner.

In event a horizontal arrangement of the tires is preferred, the dryer may be hung upon a wall hook 34 by means of a U-bolt 36, arranged on the side of the base portion 11, as best seen in Figs. 6 and 7. In such horizontal positioning of the dryer, the arm 17 will support the weight of the lower end of the lamp housing 16 so that the latter may be easily rotated.

Obviously, the height of the frame 10 may be fixed to accommodate any number of tires as convenience or necessity dictates. Likewise, the rating of the lamps 26, as well as the speed of rotation thereof, are matters of design which should pose no serious problems once a particular tire drying process is decided upon.

From an understanding of the above disclosure, it will be seen that a tire dryer embodying the principles of the invention is convenient to use and effective in operation, since the infra-red heat rays are applied directly to the inner surface, or casing of a tire.

While the tire dryer described above utilizes a battery of rotating infra-red lamps within a stack of stationary tires, it should be apparent that an arrangement may be made for rotating the stacked tires about a stationary battery of infra-red lamps to produce the same results. The important feature of the invention resides in the use of heat, preferably by infra-red radiation, applied directly to the inside surface, or casing of a tire to effectively dry the tire, and any structural modification utilizing this principle would merely represent a variation without departing from the spirit of the invention.

What is claimed is:

1. A vehicle tire dryer comprising a base portion, a plurality of elongated members forming a frame affixed perpendicularly to the base portion for maintaining tires in generally concentric relation, an elongated lamp housing supported at each end in the frame for rotation therein, said lamp housing adapted to carry a plurality of infra-red radiation lamps in criss-cross relation with the axis of each lamp arranged perpendicular to the frame, an electric motor operable for rotating said lamp housing, and a switch for control of electric current to the motor and the lamps.

2. A vehicle tire dryer comprising a base portion, a frame consisting of a plurality of pipes vertically affixed to the base portion, said frame having a diametric overall dimension no greater than the inner diameter of a vehicle tire so that the frame can receive tires and maintain them in generally concentric relation, a lamp housing supported at each end in the frame for rotation therein, said lamp housing having a plurality of lamp sockets for mounting infra-red radiation lamps in criss-cross relation with the axis of each lamp perpendicular to the vertically extending frame, an electric motor mounted in the base portion and adapted for rotating said lamp housing, and a switch for control of electric current to the motor and the lamp sockets.

3. A vehicle tire dryer comprising a base portion for placement upon a horizontal surface, a frame consisting of a plurality of tubular members vertically affixed to the base portion, said frame having a diametric overall dimension no greater than the inner diameter of a vehicle tire so that the frame can receive tires and maintain them in generally concentric relation, a hanger means projecting downwardly from the top end of the frame, a lamp housing supported at its upper end by the hanger means for rotation within the frame, said lamp housing having a plurality of lamp sockets for mounting infra-red radiation lamps in criss-cross relation with the axis of each lamp perpendicular to the vertically extending frame, a shaft rotatably mounted in the base portion, a recessed housing mounted upon said shaft above the base portion, an arm affixed to the lower end of the lamp housing and slidably arranged upon the shaft, a pin extending between the recessed housing and the arm, an electric motor mounted in the base portion and drivingly connected to the shaft, and a switch for control of electric current to the lamp sockets and the motor.

4. A vehicle tire dryer according to claim 3 wherein means are provided for attaching the base portion to a vertical surface.

5. A vehicle tire dryer for internally drying a group of vehicle tires arranged in generally concentric side-by-side relation to one another, comprising a base portion, an elongated tire retaining structure secured at one end only to said base portion and projecting in cantilever relation to said base portion through the center openings of said group of tires whereby the tires of said group can be freely removed and replaced by threading them over the outboard end of said tire retaining structure, radiant heating means extending axially through said group of tires and arranged to direct heat radially toward the insides of the tires of said group, said tire retaining structure retaining said tires of said group in spaced relation to said heating means, and means effecting relative rotation of said group of tires and said heating means generally about the axis of said group of tires.

6. A vehicle tire dryer for internally drying a stack of vehicle tires arranged in generally concentric relation to one another, comprising a bottom base portion having a flat upper surface on which the lowermost tire of said stack rests, an elongated tire retaining structure secured at its lower end only to said base portion and projecting in cantilever relation to said base portion upwardly through the center openings of said stack of tires whereby the tires of said stack can be freely removed and replaced by threading them over the upper outboard end of said tire retaining structure, radiant heating means extending vertically through said stack of tires and arranged to direct heat radially in a horizontal direction toward the insides of the tires of said stack, said tire retaining structure retaining said tires of said stack in spaced relation to said heating means, and means effecting relative rotation of said stack of tires and said heating means about a vertical axis.

7. A vehicle tire dryer for internally drying a group of vehicle tires arranged in generally concentric relation to one another about a horizontal axis, comprising a base portion, an elongated retaining structure secured at one end only to said base portion and projecting in cantilever relation to said base portion horizontally through the center openings of said group of tires whereby the tires of said group can be freely removed and replaced by threading them horizontally over the outboard end of said tire retaining structure, radiant heating means extending horizontally through said group of tires and arranged to direct heat radially toward the insides of said group, said tire retaining structure retaining the tires of said group in spaced relation to said heating means, and means effecting relative rotation of said group of tires and said heating means about a horizontal axis extending longitudinally of said tire retaining structure.

8. A vehicle tire dryer for internally drying a stack of vehicle tires arranged in generally concentric relation to one another, comprising a bottom base portion having a flat upper surface on which the lowermost tire of said stack rests, an elongated openwork tire retaining frame secured at its lower end only to said base portion and projecting in cantilever relation to said base portion upwardly through the center openings of said stack of tires whereby the tires of said stack can be freely removed and replaced by threading them over the upper outboard end of said tire retaining frame, said tire retaining frame including a plurality of longitudinal bar members spaced from the longitudinal center of said frame to provide a vertical chamber bounded by said longitudinal bar members, radiant heating means extending vertically through said chamber and arranged to direct heat radially in a horizontal direction toward the insides of the tires of said stack, and means effecting relative rotation of said stack of tires and said heating means about a vertical axis.

9. A vehicle tire dryer for internally drying a group of vehicle tires arranged in generally concentric relation to one another about a horizontal axis, comprising a base portion, an elongated openwork tire retaining frame secured at one end only to said base portion and projecting in cantilever relation to said base portion horizontally through the center openings of said group of tires whereby the tires of said group can be freely removed and replaced by threading them horizontally over the outboard end of said tire retaining frame, said tire retaining frame including a plurality of longitudinal bar members spaced from the longitudinal center of said frame to provide a horizontal chamber bounded by said longitudinal bar members, radiant heating means extending horizontally through said chamber and arranged to direct heat radially toward the insides of the tires of said group, and means effecting relative rotation of said group of tires and said heating means about a horizontal axis extending longitudinally of said tire retaining frame.

References Cited in the file of this patent

UNITED STATES PATENTS

| | | |
|---|---|---|
| 1,118,504 | McLeod | Nov. 24, 1914 |
| 1,295,596 | Price | Feb. 25, 1919 |
| 1,420,371 | Emmons | June 20, 1922 |
| 1,500,855 | Turner | July 8, 1924 |
| 2,266,375 | Mengeringhausen | Dec. 16, 1941 |
| 2,370,432 | Wesely | Feb. 27, 1945 |
| 2,428,732 | Adams | Oct. 7, 1947 |
| 2,432,106 | Wesely | Dec. 9, 1947 |
| 2,498,560 | Leeth | Feb. 21, 1950 |
| 2,588,966 | Dale | Mar. 11, 1952 |